May 9, 1961 K. MAIERSHOFER 2,983,061
SLIDE VIEWER
Filed Feb. 2, 1959 3 Sheets-Sheet 1
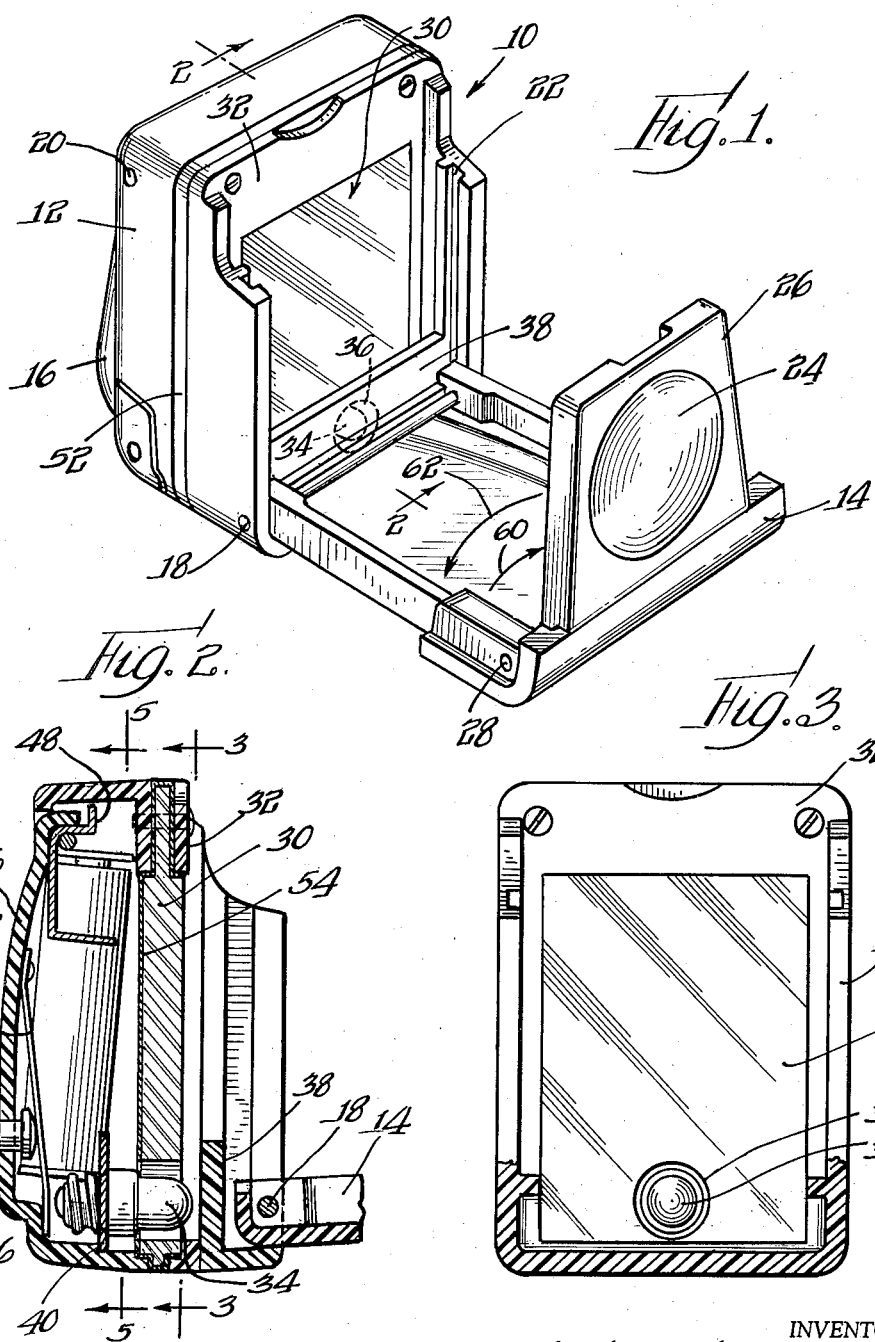
INVENTOR.
Karl Maiershofer
BY Olson & Trexler
attys.

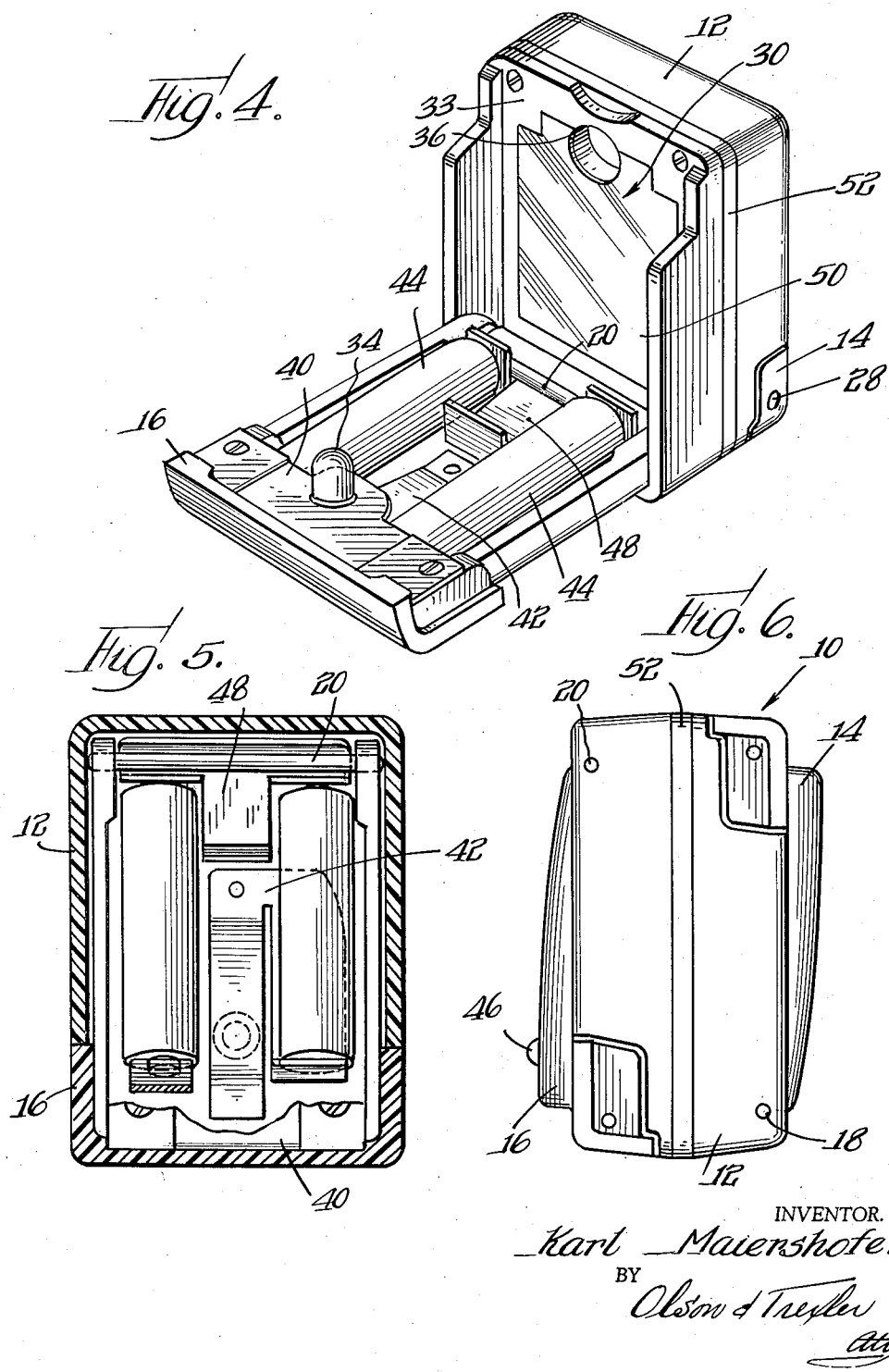

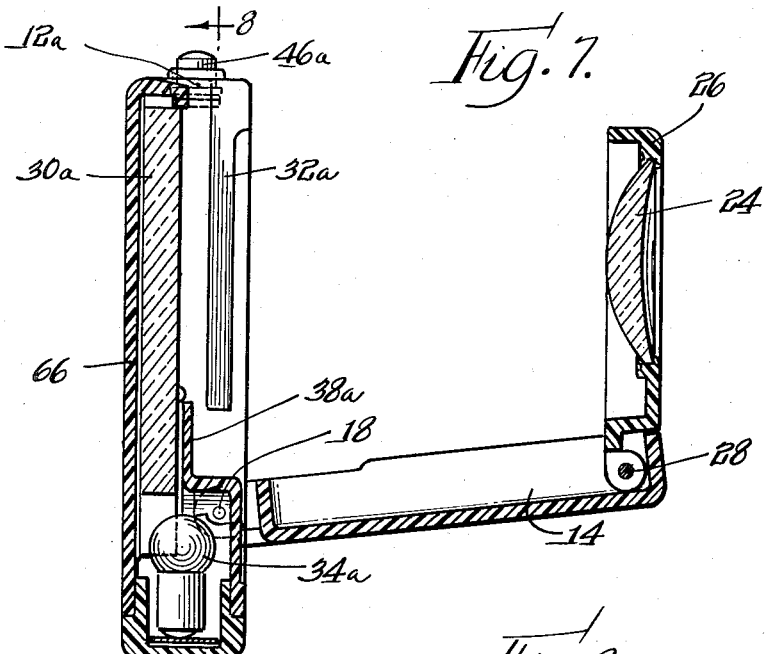
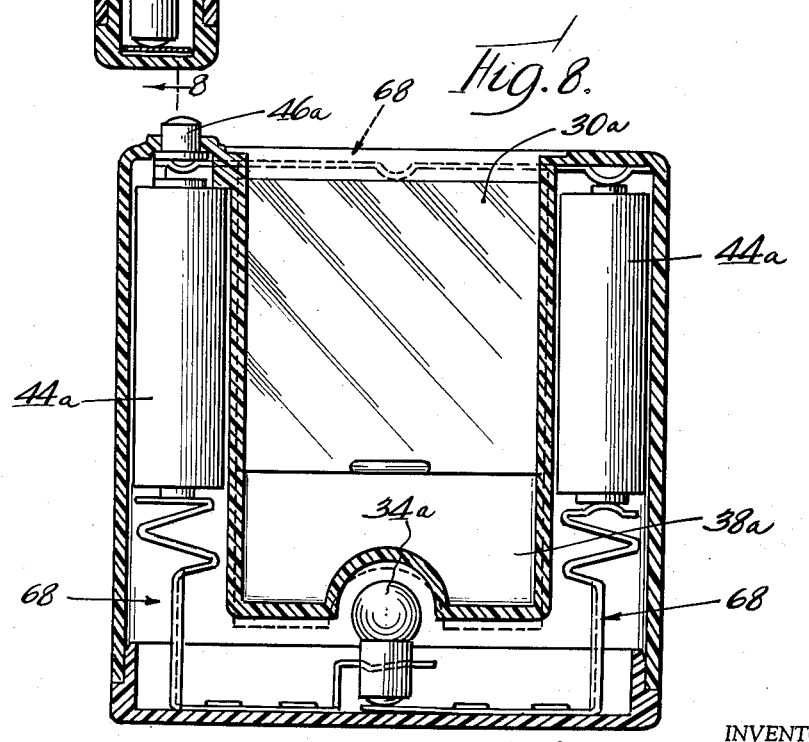

United States Patent Office 2,983,061
Patented May 9, 1961

2,983,061
SLIDE VIEWER
Karl Maiershofer, Norridge, Ill., assignor to G-M Laboratories Inc., Chicago, Ill., a corporation of Illinois
Filed Feb. 2, 1959, Ser. No. 790,654
3 Claims. (Cl. 40—63)

This invention relates generally to slide viewers and more particularly to pocket-type slide viewers.

Slide viewers of all types have heretofore been beset by the problem of obtaining uniform lighting across the diffusing screen used to illuminate the photographic slides, this problem manifesting itself most commonly by the occurrence of a "hot spot" related to the lamp or bulb located behind the diffusing screen. Slides viewed under such non-uniform illumination naturally appear "burned out" in the area associated with the "hot spot" and shaded or darkened in areas away therefrom.

The problem of non-uniform illumination has been particularly important with respect to pocket-type slide viewers because of consumer demands for a compact unit. Regardless of these demands, pocket-type viewers are noticeably bulky because of the necessity of spacing the bulb or lamp apart from the diffusing screen in order to obtain some means of uniform lighting. Other approaches to minimizing the "hot spot" problem having included instructions for specially positioning the lamp filament with respect to the diffusing screen.

Therefore, a general object of the present invention is to provide an improved slide viewer which overcomes the limitations of the prior art by incorporating a more uniformly illuminated diffusing screen.

Another object of the present invention is to provide a novel diffusing screen which is susceptible to illumination by edge-lighting.

Yet another object of the present invention is to provide a slide viewer in which the diffusing screen is readily accessible for cleaning.

A further object of the present invention is to provide a slide viewer which is of a compact and convenient size.

A still further object of the present invention is to provide a slide viewer which presents ready access to the batteries and lamp.

Additional objects and features of the invention pertain to the structure and arrangements whereby the above objects are attained.

The structure in accordance with the invention includes a housing having a groove for receiving a photographic slide, a source of illumination, a diffusing screen arranged to be edge-lighted by the source of illumination, and a viewing lens for collecting the light which emanates from the diffusing screen.

The invention, both to its structure and mode of operation, will be better understood by reference to the following disclosure and drawings forming a part thereof, wherein:

Fig. 1 is a perspective view of a slide viewer in accordance with the invention wherein the eyepiece tray is opened into the use position;

Fig. 2 is a view through the section 2—2 of the slide viewer shown in Fig. 1;

Fig. 3 is a view through the section 3—3 of Fig. 2;

Fig. 4 is a perspective view of a slide viewer in accordance with the invention wherein the battery tray is opened as for replacing the lamp and batteries;

Fig. 5 is a view through the section 5—5 of Fig. 2;

Fig. 6 is an external side view of the slide viewer in accordance with the invention;

Fig. 7 is a sectional side view of a slide viewer having a slim silhouette, being constructed in accordance with the invention; and Fig. 8 is a view through the section 8—8 of Fig. 7.

A pocket-type slide viewer constructed in accordance with a preferred embodiment of the invention includes a housing 10 having a central frame 12, an eyepiece tray 14 and a battery tray 16, the trays 14 and 16 being swingably mounted to frame 12 as by pivots 18 and 20 respectively. Advantageously, frame 12 is provided with a groove or rabbet 22 for receiving a photographic slide.

A viewing lens 24 is suitably fastened in an eyepiece 26 which, in turn, is swingably mounted to tray 14 as by the pivot 28. When eyepiece 26 is upraised ready for use, it faces the diffusing screen 30 which is carried in the central frame 12, encompassed by the front border member 32. Member 32 is provided in order to restrict exposure of the screen 30 to those portions which are illuminated in a highly uniform manner. Back border member 33 serves with front border member 32 to mount screen 30 in frame 12.

By virtue of their refractive index, certain materials are able to accept light at one point or surface and transmit that light generally from the entire surface. This well known property, commonly referred to as light piping or edge-lighting, is characteristic of certain arcylic plastic materials, particularly polymethyl methacrylate resins.

Accordingly, in a preferred embodiment of the invention, diffusing screen 30 is fashioned from a polymethyl methacrylate resin. Thus fashioned, screen 30 may be illuminated by means of a lamp or bulb 34 disposed within the hole 36 which is located near the edge of screen 30. In order to facilitate diffusion of the light from lamp 34 uniformly across the screen 30, the surface of hole 36 is generally provided with a high finish. Furthermore, slide groove 22 may terminate in a baffle 38 so as to block light radiating from the otherwise exposed portions of bulb 34.

Lamp 34 may conveniently take the form of a standard 2–3 volt flashlight bulb mounted to tray 16 as by means of the lamp support 40. Additionally, lamp 34 may be provided with electrical energy by means of the bulb contact spring 42 which forms part of a conventional series circuit with the batteries 44. Spring 42 may be conveniently operated by means of lamp control button 46 to energize selectively lamp 34, whereas batteries 44 may be properly interconnected by means of the contact clip 48.

Advantageously, the back surface 50 and any exposed edges, such as edges 52, of the diffusing screen 30 are covered with a reflective coating substance 54.

When it is desired to use the slide viewer and assuming that the viewer is in its stored configuration as shown in Fig. 6, the eyepiece tray 14 may be swung open about the pivot 18. Eyepiece 26 may then be upraised in the direction of arrow 60 into its use position. A photographic slide may then be inserted into the groove 22, whereafter depressing button 46 will connect lamp 34 with the batteries 44 and the light emanating from lamp 34 will diffuse through the screen 30 to illuminate the photographic slide positioned in the groove 22. This sequence may be continued as long as it is desired to view slides. After each use, eyepiece 26 may be returned to its stored position in tray 14, as by being rotated in the direction of arrow 62 about pivot 28; and finally, tray 14 may be closed against the frame 12.

When it is desired to replace the batteries 44 or the lamp 34, tray 16 may be swung away from frame 12 about pivot 20 accordingly as shown in Fig. 4. After the necessary replacements have been made, tray 16 may be easily returned to its former position.

Conveniently, the trays 14 and 16 may be retained in contact with the frame 12 by means of a friction fit, locking dimples, or other suitable means.

Manifestly, an even thinner package may be provided by disposing the batteries about the edges of the diffusing screen, accordingly as shown in Figs. 7 and 8. There, a diffusing screen 30a is carried by a swingable tray 66. When tray 66 is swung away from the frame member 12a, the batteries 44, the lamp 34a and the contact spring arrangement 68 are revealed. Accordingly, as shown, the contact spring arrangement 68 connects the batteries 44a and the lamp 34a in a series circuit which may be closed by means of the control button 46a.

Conveniently, illumination from the screen 30a may be controlled by means of the border member 32a and the baffle 38a. It must be pointed out that, in the embodiment of Figs. 7 and 8, it is advantageous to so arrange the batteries 40a that the diffusing screen 30a may be disposed therebetween.

While a particular embodiment of the invention has been shown, it will be understood, of course, that the invention is not limited thereto since many modifications may be made; and it is, therefore, contemplated to cover by the appended claims any such modifications as fall within the true spirit and scope of the invention.

The invention is claimed as follows:

1. A slide holding and illuminating device comprising a frame having an upright portion with opposed spaced apart channels adapted to receive and support a transparent slide, said frame having a horizontal projection adapted to hold said channels at a predetermined distance from a lens, a light diffusing screen of transparent material having front and back substantially parallel spaced-apart faces, the back face and at least portions of the edges of said screen having a reflective coating thereon, at least a major portion of the front face of said screen corresponding at least to the area of a slide to be illuminated being free of such coating, means supporting said light diffusing screen from said frame on the opposite side of said channels from said frame projection and with the front face of the screen disposed toward the channels, a light bulb, means supporting said light bulb from said frame adjacent an uncoated edge portion of said screen and with at least a portion of said bulb lying between the planes respectively containing the front and rear faces of said screen whereby to illuminate said screen internally and to reflect light out through the uncoated portion of the front face of said screen to illuminate from behind a slide supported by said channels, and electric power means supported from said frame for energizing said bulb.

2. A slide device as set forth in claim 1 wherein the screen is provided with an aperture adjacent a marginal edge of said screen, and the light bulb projects into said aperture, the edge of said aperture being free of said coating.

3. A slide device as set forth in claim 1 wherein the frame projection is pivotally connected to the frame and folds into proximity therewith, and further including a lens and a lens holder pivotally mounted on said projection and foldable into proximity therewith.

References Cited in the file of this patent

UNITED STATES PATENTS

| | | |
|---|---|---|
| 2,347,665 | Christensen et al. | May 2, 1944 |
| 2,837,628 | Lamb et al. | June 3, 1958 |
| 2,907,869 | Hudson et al. | Oct. 6, 1959 |

FOREIGN PATENTS

| | | |
|---|---|---|
| 942,721 | Germany | Apr. 12, 1956 |
| 1,008,928 | Germany | May 23, 1957 |
| 1,032,498 | France | July 2, 1953 |